US012004916B2

(12) United States Patent
Chapman et al.

(10) Patent No.: US 12,004,916 B2
(45) Date of Patent: Jun. 11, 2024

(54) HYGIENIC BRUSH (71) Applicant: SDC U.S. SmilePay SPV, Nashville, TN (US)

(72) Inventors: Josh Chapman, Nashville, TN (US); Brittany Lacey, Nashville, TN (US)

(73) Assignee: SDC U.S. SmilePay SPV, New York, NY (US)

( * ) Notice: Subject to any disclaimer, the term of this patent is extended or adjusted under 35 U.S.C. 154(b) by 552 days.

(21) Appl. No.: 16/930,527

(22) Filed: Jul. 16, 2020

(65) Prior Publication Data

US 2021/0007835 A1 Jan. 14, 2021

Related U.S. Application Data (63) Continuation of application No. 16/510,239, filed on Jul. 12, 2019, now Pat. No. 10,786,339.

(51) Int. Cl.
*A61C 17/34* (2006.01)
*A46B 5/00* (2006.01)
*A46B 9/04* (2006.01)
*A46B 17/04* (2006.01)
*A61C 17/22* (2006.01)
*A46B 7/06* (2006.01)
(Continued)

(52) U.S. Cl.
CPC ........ *A61C 17/3481* (2013.01); *A46B 5/0029* (2013.01); *A46B 9/04* (2013.01); *A46B 17/04* (2013.01); *A61C 17/222* (2013.01); *A46B 7/06* (2013.01); *A46B 9/028* (2013.01); *A46B 13/023* (2013.01); *A46B 2200/1066* (2013.01)

(58) Field of Classification Search
CPC . A61C 17/3481; A61C 17/222; A46B 5/0029; A46B 9/04; A46B 17/04
See application file for complete search history.

(56) References Cited

U.S. PATENT DOCUMENTS 4,880,382 A * 11/1989 Moret ................ A46B 15/0075
601/142
4,991,249 A * 2/1991 Suroff ................ A46B 15/0002
433/119

(Continued)

FOREIGN PATENT DOCUMENTS

CN 203226724 U 10/2013
DE 102009037324 A1 * 2/2011 ............. A46B 17/00

(Continued)

OTHER PUBLICATIONS

WO-2019072018-A1—English Machine Translation (Year: 2019).*
International Search Report and Written Opinion on PCT/US2020/041678, dated Sep. 30, 2020, 11 pages.

*Primary Examiner* — Marc Carlson
(74) *Attorney, Agent, or Firm* — Foley & Lardner LLP (57) ABSTRACT

An apparatus includes a toothbrush head configured to brush teeth, an appliance brush configured to brush a dental appliance, and a body configured to be releasably coupled with either one of the toothbrush head and the appliance brush such that the appliance brush and the toothbrush head are interchangeable. The body includes a vibration component configured to vibrate the toothbrush head or the appliance brush head when coupled with the body. When the appliance brush is coupled with the body, a greater portion of the body is exposed than when the toothbrush head is coupled with the body.

22 Claims, 9 Drawing Sheets (51) Int. Cl.
*A46B 9/02* (2006.01)
*A46B 13/02* (2006.01)

(56) References Cited

U.S. PATENT DOCUMENTS

| | | | |
|---|---|---|---|
| 5,613,259 A * | 3/1997 | Craft | A61C 17/3481 |
| | | | 310/68 B |
| 6,920,659 B2 | 7/2005 | Cacka et al. | |
| 6,948,209 B2 | 9/2005 | Chan | |
| 7,055,205 B2 | 6/2006 | Aoyama | |
| 7,117,555 B2 | 10/2006 | Fattori et al. | |
| 7,389,781 B2 | 6/2008 | Kemp et al. | |
| 7,757,326 B2 | 7/2010 | Jimenez et al. | |
| 7,765,629 B2 | 8/2010 | Kressner | |
| 8,201,295 B2 | 6/2012 | Gatzemeyer et al. | |
| 8,327,490 B2 | 12/2012 | Hafliger et al. | |
| 8,332,982 B2 | 12/2012 | Braun et al. | |
| 8,388,250 B2 | 3/2013 | Harden | |
| 8,499,396 B2 | 8/2013 | Byeon | |
| 8,561,248 B2 | 10/2013 | Fatiny | |
| 8,758,022 B2 | 6/2014 | Kim | |
| 8,881,333 B1 * | 11/2014 | Malakova | A46B 7/04 |
| | | | 15/176.4 |
| 8,966,697 B2 | 3/2015 | Kim et al. | |
| 9,301,821 B2 | 4/2016 | Fattori | |
| 9,301,823 B2 | 4/2016 | Jimenez | |
| D762,986 S | 8/2016 | May et al. | |
| 9,552,743 B2 | 1/2017 | Meriheinae et al. | |
| 9,649,181 B2 | 5/2017 | Sorrentino | |
| 9,848,968 B2 | 12/2017 | Jungnickel et al. | |
| D833,600 S * | 11/2018 | Porter | D24/111 |
| D869,850 S * | 12/2019 | Luo | D28/63 |
| 2005/0004498 A1 * | 1/2005 | Klupt | A61C 17/222 |
| | | | 433/80 |
| 2008/0209650 A1 * | 9/2008 | Brewer | A61C 17/221 |
| | | | 433/119 |
| 2009/0189084 A1 | 7/2009 | Pinsky | |
| 2010/0263148 A1 * | 10/2010 | Jimenez | A46B 7/06 |
| | | | 15/22.1 |
| 2012/0036665 A1 | 2/2012 | Cho | |
| 2014/0166900 A1 * | 6/2014 | Nelson | A61L 2/10 |
| | | | 250/455.11 |
| 2015/0034113 A1 * | 2/2015 | Yamagishi | A46B 13/023 |
| | | | 132/200 |
| 2015/0113747 A1 | 4/2015 | May et al. | |
| 2015/0182415 A1 * | 7/2015 | Olkowski | A46B 9/028 |
| | | | 604/295 |
| 2015/0289635 A1 * | 10/2015 | Erskine-Smith | A61C 17/222 |
| | | | 15/143.1 |
| 2016/0022398 A1 | 1/2016 | Vetter et al. | |
| 2016/0135581 A1 | 5/2016 | Pai | |
| 2016/0343270 A1 | 11/2016 | Zheng et al. | |
| 2017/0105825 A1 * | 4/2017 | Okai | A45D 44/18 |
| 2017/0112273 A1 | 4/2017 | Bloch et al. | |
| 2017/0119510 A1 * | 5/2017 | Tomori | A61C 17/224 |
| 2017/0215573 A1 * | 8/2017 | Phillips | A61C 17/3481 |
| 2018/0021117 A1 * | 1/2018 | Kitagawa | A61C 17/224 |
| | | | 15/22.1 |
| 2018/0035797 A1 * | 2/2018 | Mahawar | A46B 15/0061 |
| 2018/0256430 A1 * | 9/2018 | Zachar | A46B 15/0053 |
| 2018/0296309 A1 | 10/2018 | Yoshida et al. | |
| 2018/0368564 A1 | 12/2018 | Zheng | |
| 2019/0014901 A1 * | 1/2019 | Xi | A61N 5/0603 |
| 2019/0038014 A1 | 2/2019 | Greer et al. | |
| 2019/0045917 A1 | 2/2019 | Kitajo et al. | |
| 2019/0069979 A1 | 3/2019 | Scheuren | |
| 2019/0070326 A1 | 3/2019 | Xie et al. | |
| 2019/0117356 A1 * | 4/2019 | Bärtschi | A47K 7/04 |
| 2019/0167399 A1 | 6/2019 | Kawabata et al. | |

FOREIGN PATENT DOCUMENTS

| | | | | |
|---|---|---|---|---|
| TW | 512961 U | * 12/2015 | | |
| WO | WO-2019/072018 A1 | 4/2019 | | |
| WO | WO-2019072018 A1 | * 4/2019 | | A61B 1/00087 |

* cited by examiner

HYGIENIC BRUSH

CROSS-REFERENCE TO RELATED APPLICATIONS

This application is a continuation of U.S. application Ser. No. 16/510,239, filed on Jul. 12, 2019, the contents of which are incorporated herein by reference in its entirety.

BACKGROUND

This application relates generally to the field of dental hygiene. More specifically, this application relates to a toothbrush that includes a vibrating element and an additional brush for an orthodontic appliance.

Various devices are available to clean teeth to improve dental hygiene. Conventional toothbrushes include bristles attached to a brush head, and the brush head attached to a handle, where a user cleans his or her teeth by physically moving the bristles across the teeth in a reciprocating motion. More recently, toothbrushes have incorporated electrical components to aid in cleaning teeth. Some electrical toothbrushes include a brush head that incorporates a rotational motion induced by a motor. Other electrical toothbrushes include a brush head that incorporates a vibrational motion induced by a motor.

Regardless of the type of brushing method, the bristles of conventional toothbrushes and current toothbrushes include bristles designed to clean teeth. However, many users also have orthodontic appliances (e.g., aligners, night guards, retainers, etc.) that require cleaning. Some users attempt to clean the orthodontic appliances with bristles designed to clean teeth, resulting in suboptimal cleaning and excessive wear to the bristles as the shape of orthodontic appliances generally differ from the shape of teeth (e.g., teeth generally protrude from the gums, while orthodontic appliances generally include deep recesses to clean).

A toothbrush operable to brush both teeth and orthodontic appliances using vibrations is desirable to address the complications associated with attempting to clean orthodontic appliances with a conventional toothbrush.

SUMMARY

An embodiment relates to an apparatus that includes a toothbrush head, a body, and an appliance brush. The toothbrush head is configured to brush teeth. The body is releasably coupled with the toothbrush head, and the body comprises a vibration component and an element. The vibration component is configured to vibrate the toothbrush head. The element is configured to operate the vibration component. The appliance brush is interchangeable with the toothbrush head and configured to brush a dental appliance.

Another embodiment relates to a brush system that includes a toothbrush head, a body, an appliance brush, and a dock. The toothbrush head includes a bristle, a massager, a scrubber, and a stem. The stem extends from the toothbrush head. The body is releasably coupled with the stem by an extension of the body. The body comprises a vibration component configured to vibrate the toothbrush head, and an element configured to operate the vibration component. The appliance brush is interchangeable with the toothbrush head and configured to brush a dental appliance. The dock is operable to be releasably coupled with the body or the toothbrush head. The dock comprises a compartment configured to store the appliance brush when the appliance brush is decoupled from the body.

Another embodiment relates to an electronic brush including an appliance brush, a body, and a dock. The appliance brush includes a connector, and bristles arranged in a first pattern such that the bristles form a convex brushing surface. The body is configured to releasably couple with the appliance brush by the connector or with a toothbrush head comprising bristles arranged in a second pattern. The body includes a vibration component configured to vibrate the appliance brush. The dock is configured to secure the body, and comprises a cavity disposed between a cover and a base. The cavity is configured to store the appliance brush when the appliance brush is decoupled form the body.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Figure 1:
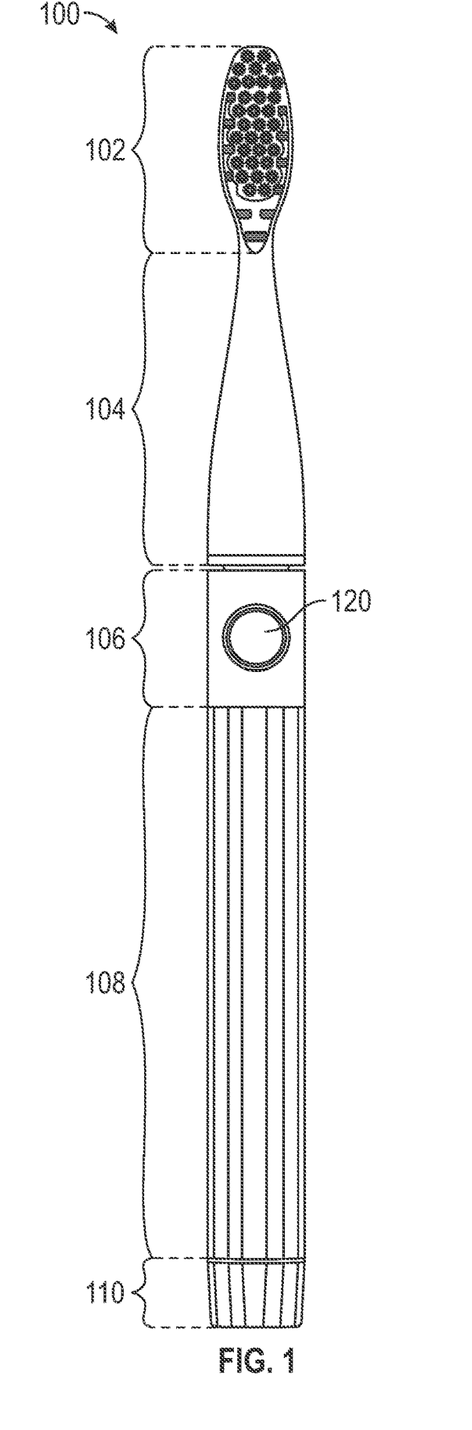
FIGS. 1-2 are illustrations of a toothbrush, according to some embodiments.
Figure 2:
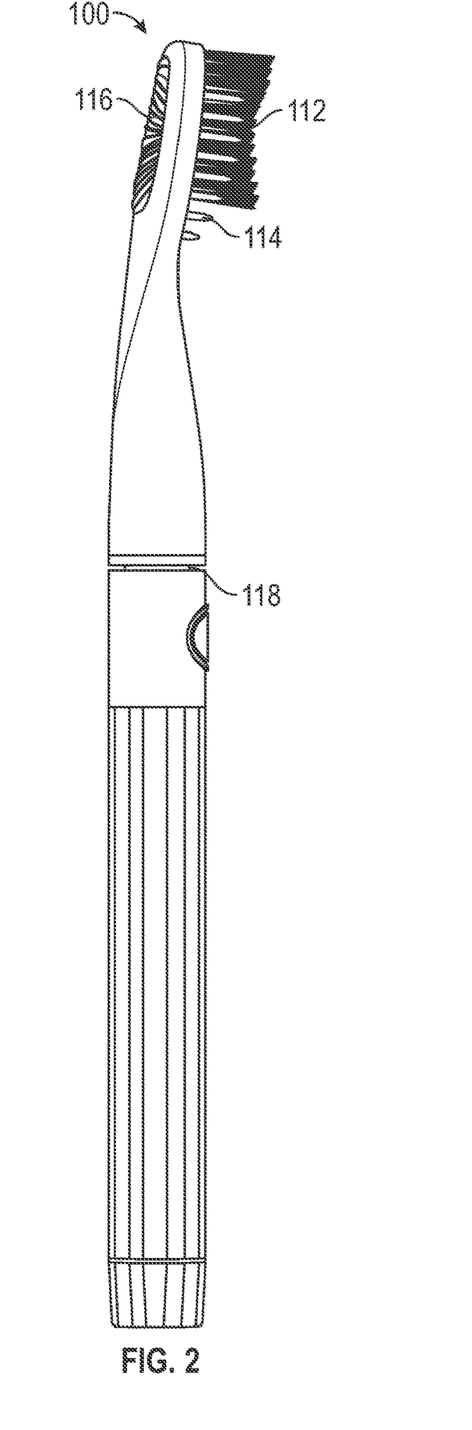

Referring to FIGS. 1-2, illustrations of a toothbrush 100 are shown, according to some embodiments. While the term "toothbrush" is used for ease of reference throughout this application, it will be appreciated that the toothbrush 100 can be any type of hygienic brush, such as a brush for cleaning a dental appliance such as a dental aligner, as will be explained. The toothbrush 100 includes a brush head 102, a stem 104, a body 106, a handle 108, a cap 110, and a gap 118. The brush head 102 is rigidly coupled to the stem 104 and includes bristles 112, massagers 114, and a scrubber 116. The scrubber 116 is located opposite the bristles 112 and the massagers 114. The bristles 112, massagers 114, and scrubber 116 will be further described with reference to FIGS. 5-6. While the body 106 and the handle 108 are shown as separate components releasable from one another, in some embodiments, the body 106 and the handle 108 are one component, which together can be referred to as the "body."

In some embodiments, the brush head 102 and the stem 104 can be a unitary component. In some embodiments, the brush head 102 and the stem 104 can be separate components rigidly coupled. The brush head 102 and the stem 104 can be manufactured from a plastic material (e.g., polycarbonate, polyethylene, nylon, or any other type of plastic material suitable for use in the mouth), or a metal material (e.g., aluminum, anodized aluminum, or any other type of metal material suitable for use in the mouth). In some embodiments, the brush head 102 and the stem 104 can be manufactured with any suitable process (e.g., molding, machining, 3-D printing, or any other manufacturing method suitable to form the brush head 102 and the stem 104).

The body 106 is releasably coupled to the stem 104. The body 106 is operable to induce a vibratory motion in the brush head 102. The body 106 includes components that extend into the stem 104; therefore, the stem 104 is substantially hollow to receive the components. The body 106 includes a button 120 that is electrically connected to a battery (not shown) and to the components within the body 106 that induce a vibratory motion in the brush head 102. The body 106 and its operation will be further described with reference to FIG. 3.

The handle 108 is releasably coupled to the body 106 and provides a surface for a user to grip while using the toothbrush 100. The handle 108 can be manufactured using any suitable material (e.g., plastic, anodized aluminum, or any other material suitable for use near the mouth). The handle 108 is substantially cylindrical, however other suitable shapes can be implemented. For example, the handle 108 can be in the shape of a hexadecagon. In embodiments where the handle 108 is in the shape of a hexadecagon, the components to which the handle 108 is coupled (e.g., the body 106 and the cap 110) can also be in the shape of a hexadecagon. The handle 108 is also operable to receive the battery; therefore, the handle 108 is at least partially hollow to receive the battery.

The cap 110 is releasably coupled to the handle 108 (e.g., by a threaded connection, a snap fit connection, a bayonet connection, a friction fit connection, or any other suitable releasable connection) and defines a space in which an appliance brush (not shown) is stored. The cap 110 can be manufactured using any suitable material (e.g., plastic, anodized aluminum, or any other material suitable for use near the mouth). As described, in some embodiments the shape of the cap 110 can be equivalent to the shape of the handle 108. Because the cap 110 provides a space in which the appliance brush is stored, the cap 110 is substantially hollow.

The gap 118 is a space between the outer diameter of the stem 104 and the outer diameter of the body 106 that provides clearance to reduce the vibrations of the stem 104 when vibrations are imparted by the brush head 102. For example, when the brush head 102 is vibrating, the stem 104 will also vibrate because the brush head 102 and the stem 104 are rigidly coupled. The gap 118 reduces the amount of structure of the stem 104 contacting the body 106, thereby dampening the vibrations in the stem 104, and thereby allowing the brush head 102 to vibrate as desired to clean teeth.

Figure 3:
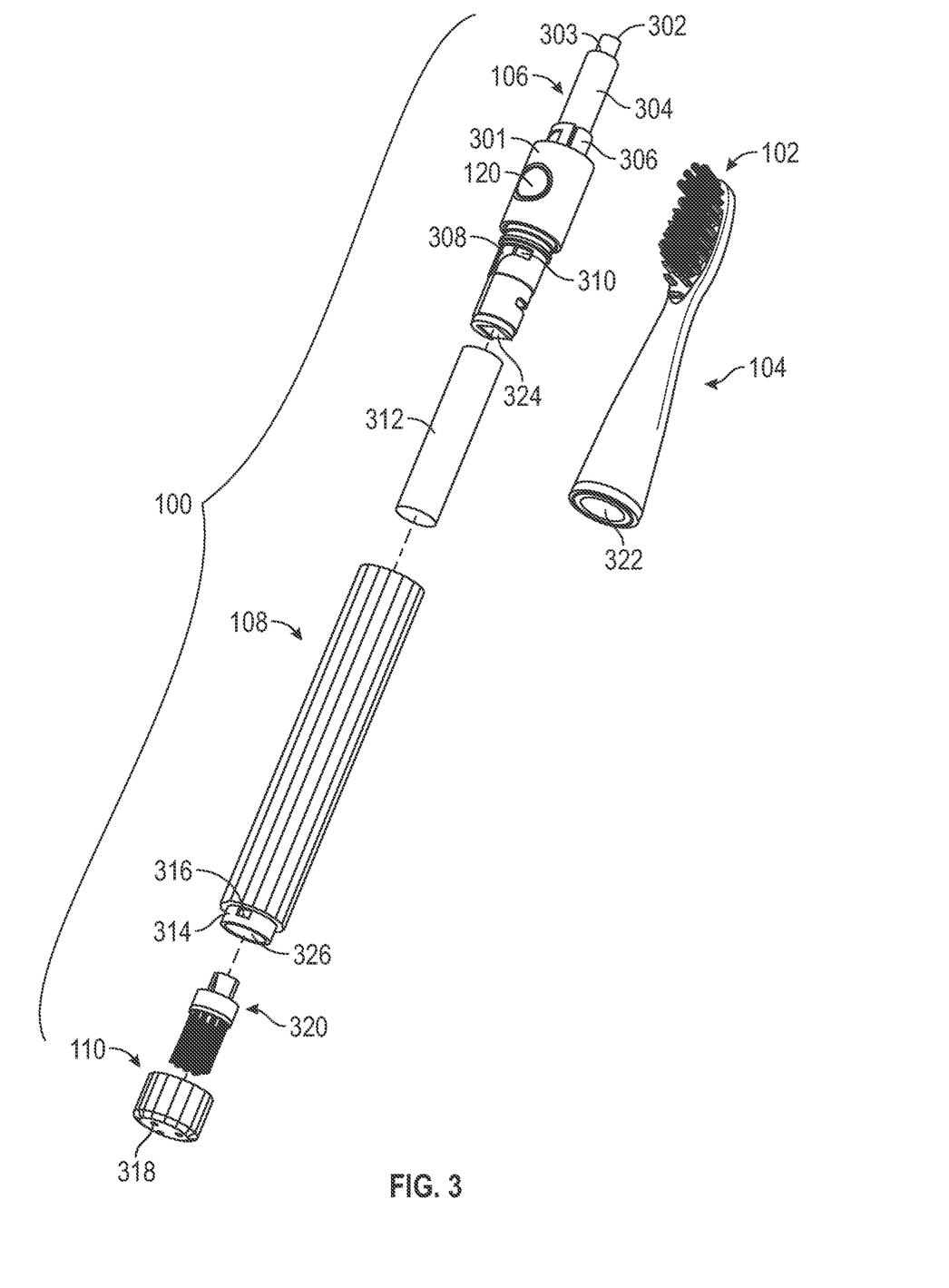
FIG. 3 is an illustration of an exploded view of the toothbrush of FIGS. 1-2.

Referring to FIG. 3, an illustration of an exploded view of the toothbrush 100 of FIGS. 1-2 is shown. As shown, the body 106 includes a housing 301, a tip 302, an appliance brush connection 303, an extension 304, a stem connection 306, a handle connection 308, a rib 310, and an electrical connection 324.

The housing 301 is sized and configured to receive a motor (not shown); therefore, the housing 301 is substantially hollow to provide a space to receive the motor. The motor is in electrical communication with the button 120 such that when the user presses the button 120 to turn on the toothbrush 100, the motor rotates, causing the brush head 102 to vibrate. When the user presses the button 120 to turn off the toothbrush 100, the motor stops rotating, causing the brush head 102 to stop vibrating. In some embodiments, the user can select a vibration speed by pressing the button 120 a specific number of times. For example, the user can press the button 120 once to cause the toothbrush 100 to vibrate at a first speed (e.g., a high speed). The user can press the button 120 a second time to cause the toothbrush 100 to vibrate at a second speed (e.g., a medium speed). The user can press the button 120 a third time to cause the toothbrush 100 to vibrate at a third speed (e.g., a slow speed). The user can press the button 120 a fourth time to cause the toothbrush 100 to stop vibrating. In some embodiments, the user can select a vibration pattern by pressing the button 120 a specific number of times. For example, the user can press the button 120 once to cause the toothbrush 100 to pulse at a first pulse rate (e.g., a high pulse rate). The user can press the button 120 a second time to cause the toothbrush 100 to pulse at a second pulse rate (e.g., a medium pulse rate). The user can press the button 120 a third time to cause the toothbrush 100 to pulse at a third pulse rate (e.g., a low pulse rate). The user can press the button 120 a fourth time to cause the toothbrush 100 to stop vibrating. In some embodiments, pressing the button 120 multiple times can cycle through a combination of vibration speeds and/or pulse speeds.

In some embodiments, the housing 301 is also sized and configured to receive a sensor (not shown) in communication with the motor and a computing device (not shown). As used herein, the term "computing device" refers to a device including at least one of a circuit, a field-programmable gate array, and a processor and a memory where the processor is configured to execute instructions stored in the memory. The sensor is operable to detect the orientation of the toothbrush 100 when the motor is rotating and provide orientation information to the computing device. The computing device determines if the orientation of the toothbrush 100 needs to be modified, and provides feedback to the user to notify the user. For example, the user may activate the toothbrush 100 by pressing the button 120 such that the brush head 102 vibrates. If the user holds the brush in one orientation for too long (e.g., brushing the same teeth for a prolonged period), the sensor notifies the computing device. The computing device instructs the motor to provide a vibration pulse, causing the motor to rotate faster for a short period to provide the vibration pulse. The user feels the vibration pulse in his or her mouth, notifying the user that it is time to switch positions and brush other teeth.

In some embodiments, the sensor is a timer and notifies the computing device after a specified period has passed (e.g., 30 seconds, 1 minute, or any other amount of time). The computing device instructs the motor to provide a vibration pulse as described above to notify the user that the specified time has passed, and that the user should brush other teeth in his or her mouth. In addition, the vibration pulse can notify the user regarding the amount of time to brush a dental or orthodontic appliance. For example, the user can brush an aligner with an appliance brush 320. The vibration pulse can notify the user when the aligner, or a part thereof, has been brushed for the appropriate amount of time to clean the aligner (e.g., 30 seconds, 1 minute, or any other amount of time). For example, the vibration pulse can pulse every 30 seconds to first notify the user that they have brushed the interior surface of an aligner a sufficient amount of time, and then again to notify the user that they have brushed the exterior surface of the aligner a sufficient amount of time.

The extension 304 extends from the housing 301 and is sized and configured to fit within an opening 322 in the stem 104. The extension 304 is also sized and configured to receive a vibration element (not shown) in communication with the motor. In some embodiments, the vibration element is a weight mounted eccentrically to the motor such that, when the motor rotates, the weight spins eccentrically, thereby causing vibrations (e.g., an eccentric rotating mass) in the brush head 102. In some embodiments, the vibration element is a magnetic mass attached to a spring and driven by a coil (e.g., a linear resonant actuator). The vibration element is positioned near the brush head 102 such that the vibrational motion is focused near the brush head 102.

The tip 302 extends from the extension 304 and is sized and configured to be received by the appliance brush 320. The appliance brush connection 303 is operable to releasably couple with the appliance brush 320. The appliance brush connection 303 can be any type of connection suitable for components to be securely connected when desired, and to be easily disconnected when desired. One example of a suitable connection is a bayonet connection. Another example of a suitable connection is a quick connect fitting. Another example of a suitable connection is a threaded connection. In some embodiments, the appliance brush 320 couples directly with the tip 302 (e.g., by a friction fit or press fit connection) and does not couple with the appliance brush connection 303. The interaction between the tip 302 and the appliance brush 320 will be further described with reference to FIGS. 7-8.

The stem connection 306 is operable to releasably couple with the stem 104. The stem connection 306 can be any type of connection suitable for components to be securely connected when desired, and to be easily disconnected when desired. One example of a suitable connection is a bayonet connection. Another example of a suitable connection is a quick connect fitting. Another example of a suitable connection is a threaded connection. In the embodiment where the stem connection 306 is a bayonet connection, the stem 104 is connected to the body 106 by inserting the extension 304 into the opening 322 until a tab (not shown) within the opening 322 interfaces with the stem connection 306. When the stem 104 is seated on the body 106, the stem 104 is rotated such that the tab slides along the stem connection 306 to secure the stem 104 to the body 106. In some embodiments, the tab may interface with a rib (not shown) on the body 106 such that the tab passes over the rib during the rotation and the rib securely holds the tab in place. In this orientation, the brush head 102 is longitudinally aligned with the button 120. In some embodiments, the user will feel a tactile sensation indicating that the body 106 is properly coupled to the stem 104. In some embodiments, the user will hear an audible indicator to indicate that the body 106 is properly coupled to the stem 104. To disconnect the stem 104 from the body 106, the stem 104 is rotated in the opposite direction to dislodge the tab from the rib, and then the stem 104 can be separated from the body 106. In some embodiments, the stem 104 couples to the extension 304 without the stem connection 306 (e.g., by a friction fit or press fit connection).

The handle connection 308 includes a rib 310, and is operable to releasably couple with the handle 108. The handle connection 308 can be any type of connection suitable for components to be securely connected when desired, and to be easily disconnected when desired. One example of a suitable connection is a bayonet connection. Another example of a suitable connection is a quick connect fitting. Another example of a suitable connection is a threaded connection. In the embodiment where the handle connection 308 is a bayonet connection, the handle 108 is connected to the body 106 by inserting the body 106 into an opening (not shown) in the handle 108 until a tab (not shown) within the opening interfaces with the handle connection 308. When the handle 108 is seated on the body 106, the handle 108 is rotated such that the tab slides along the handle connection 308 to secure the handle 108 to the body 106. In some embodiments, the tab may interface with the rib 310 on the body 106 such that the tab passes over the rib 310 during the rotation and the rib 310 securely holds the tab in place. To disconnect the handle 108 from the body 106, the handle 108 is rotated in the opposite direction to dislodge the tab from the rib 310, and then the handle 108 can be separated from the body 106.

The electrical connection 324 is operable to be electrically coupled with the battery 312, the motor, and the button 120. The electrical connection 324 provides an electrical pathway between the battery 312 and the motor such that the battery 312 provides power to the motor when the user presses the button 120 to turn on the toothbrush 100. The electrical connection 324 can be any type of connection (e.g., clips, contacts, etc.) that can transfer power from the battery 312 to the motor.

The battery 312 is operable to provide power to the motor via the electrical connection 324. The battery 312 is configured to fit within the handle 108; therefore, the handle 108 is substantially hollow to accommodate the battery 312. The battery 312 can be any type of battery (e.g., a AAA battery, a AA battery, a rechargeable battery, or any other kind of battery) suitable to provide power for a toothbrush.

The handle 108 includes a cap connection 314, a rib 316, and an opening 326. The cap connection 314 includes a rib 316, and is operable to releasably couple with the cap 110. The cap connection 314 can be any type of connection suitable for components to be securely connected when desired, and to be easily disconnected when desired. One example of a suitable connection is a bayonet connection. Another example of a suitable connection is a quick connect fitting. Another example of a suitable connection is a threaded connection.

In the embodiment where the cap connection 314 is a bayonet connection, the cap 110 is connected to the handle 108 by inserting the handle 108 into an opening (not shown) in the cap 110 until a tab (not shown) within the opening interfaces with the cap connection 314. When the handle 108 is seated on the cap 110, the cap 110 is rotated such that the tab slides along the cap connection 314 to secure the handle 108 to the cap 110. In some embodiments, the tab may interface with the rib 316 on the handle 108 such that the tab passes over the rib 316 during the rotation and the rib 316 securely holds the tab in place. To disconnect the handle 108 from the cap 110, the cap 110 is rotated in the opposite direction to dislodge the tab from the rib 316, and then the handle 108 can be separated from the cap 110. The opening 326 is sized and configured to receive an appliance brush 320 such that the appliance brush 320 can be stored within the toothbrush 100 when the stem 104 is coupled to the body 106.

The cap 110 can include any number of apertures 318. In some embodiments, the cap 110 includes at least one aperture 318. As shown in FIG. 3, in some embodiments, the cap 110 includes three apertures 318. The aperture 318 is an opening extending through the cap 110 such that liquid trapped between the cap 110 and the handle 108 (e.g., excess liquid on the appliance brush 320 when stored) drains out of the handle 108 and cap 110 through the aperture 318.

To assemble the toothbrush 100, the appliance brush 320 is positioned within the opening 326, and the cap 110 is coupled to the handle 108 as described. The battery 312 is inserted into the handle 108, and the body 106 is inserted into the handle 108 and coupled to the body 106 as described. The extension 304 is inserted into the opening 322, and the stem 104 is coupled to the body 106 as described. Once assembled, the toothbrush 100 is ready for use.

Figure 4:
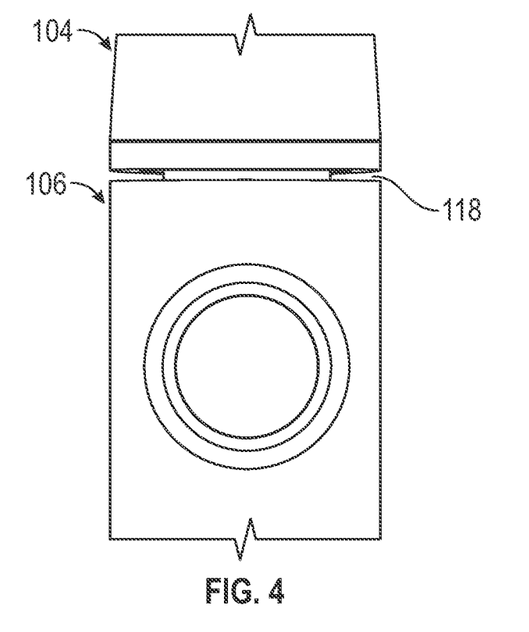
FIG. 4 is an illustration of a portion of the toothbrush of FIGS. 1-2.

Referring to FIG. 4, an illustration of the gap 118 of the toothbrush 100 of FIGS. 1-2 is shown. The gap 118 is located between the stem 104 and the body 106 and provides a space for the stem 104 to deflect during operation of the toothbrush 100. For example, during operation of the toothbrush 100, the motor causes the brush head 102 to vibrate. As the brush head 102 vibrates, the stem 104 also vibrates because the brush head 102 and the stem 104 are rigidly coupled. The vibrations induced in the brush head 102 and the stem 104 cause the brush head 102 and the stem 104 to move back and forth. As the stem 104 moves back and forth, the size of the gap 118 constantly changes. When the stem 104 moves in one direction, the gap 118 becomes shorter in the direction in which the stem 104 moves and becomes longer opposite the direction in which the stem 104 moves. As such, the gap 118 prevents the stem 104 from contacting the housing 301 during operation, thereby preventing the transmission of a significant portion of the vibrations from the stem 104 to the housing 301, thereby dampening the vibrations of the brush head 102.

Figure 5:
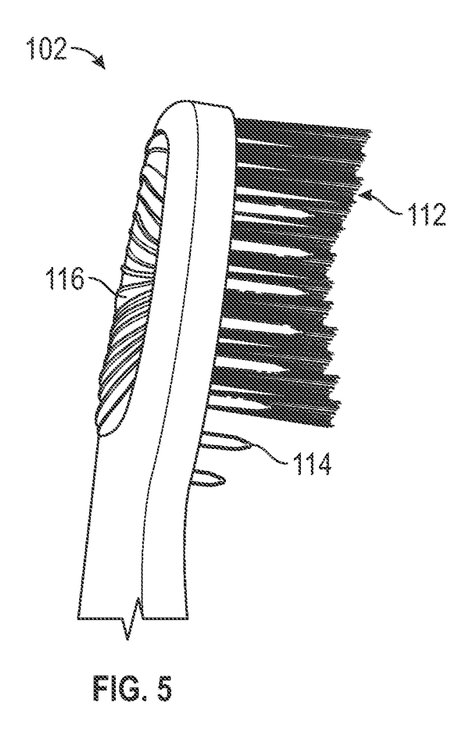
FIGS. 5-6 are illustrations of a brush head of the toothbrush of FIGS. 1-2.
Figure 6:
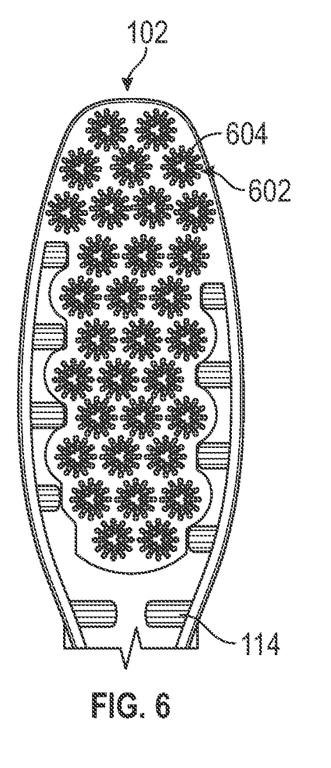

Referring to FIGS. 5-6, illustrations of a brush head 102 of the toothbrush 100 of FIGS. 1-2 is shown. The brush head 102 includes the bristles 112, the massagers 114, and the scrubber 116. The bristles 112 include at least one tuft 602, and the tuft 602 includes at least one filament 604. In some embodiments, a plurality of tufts 602 are coupled to the brush head 102 such that the base of the tufts 602 do not move relative to the brush head 102. The tufts 602 can be coupled to the brush head 102 using any conventional coupling methods suitable to secure the tufts 602 to the brush head 102. Examples of coupling methods include injection molding, stapling, adhesive bonding, and any other method capable of joining the tufts 602 to the brush head 102.

In some embodiments, the tufts 602 include a plurality of filaments 604. The filament 604 can be manufactured using any material suitable for use in the mouth. Examples of materials for use in the filament 604 include, but are not limited to, nylon, thermoplastic elastomers, polyester, polyethylene, and polystyrene. In some embodiments, the filament 604 includes a roughened surface that provides for more efficient cleaning of teeth, and can have a whitening effect on teeth. For example, the roughened surfaced of the filament 604 can remove stains that would not be removed with a conventional filament, revealing the white enamel underneath the stains. In some embodiments, the filament 604 includes fluoride such that fluoride is applied to the teeth during brushing. For example, the filament 604 can include a hollow portion in which fluoride is deposited and is transferred to the teeth during brushing. In some embodiments, the filament 604 includes a circular cross section. In some embodiments, the filament 604 includes a substantially triangular cross section. In embodiments in which the filament 604 exhibits a substantially triangular cross section, the filament 604 can be a composite that includes different materials at the points of the triangle. For example, the points of the triangle can be a thermoplastic elastomer while the remaining portion can be nylon. Such embodiments can provide for more efficient cleaning of teeth.

As shown in FIG. 6, the plurality tufts 602 can be arranged in a pattern on the brush head 102. In some embodiments, the plurality of tufts 602 can be arranged in groups of two, three, or four tufts 602 across the brush head 102. In some embodiments, the plurality of tufts 602 are arranged such that the tufts 602 are offset from each other to minimize the amount of empty space between the tufts 602.

The massagers 114 are operable to massage and clean the gums of a user while the user brushes his or her teeth. As shown, the massagers 114 are arranged around the periphery of the brush head 102 and surround the tufts 602. However, in some embodiments the massagers 114 are arranged in between the tufts 602. The massagers 114 are manufactured from any material suitable for use in the mouth to massage and clean the gums. Suitable materials include, but are not limited to, silicone and rubber. In some embodiments, the massagers 114 are more rigid than the tufts 602. In some embodiments, the massagers 114 are less rigid than the tufts 602.

The massagers 114 are manufactured integrally with the brush head 102 such that the massagers 114 cannot be removed from the brush head 102. For example, the massagers 114 are molded to the brush head 102 as part of a two-shot molding process in which the brush head 102 is molded with the first shot of material, and the massagers 114 are molded with the second shot of material, where the second shot uses a different material than the first shot.

The scrubber 116 is operable to clean the tongue and/or other oral structures. As shown, the scrubber 116 is arranged on the brush head 102 opposite the bristles 112 such that the user must turn the toothbrush 100 by 180 degrees to use the scrubber 116 on the same surface that was being brushed with the brush head 102. In embodiments, the scrubber 116 is arranged in other locations on the brush head 102. For example, the scrubber 116 can be located adjacent to the bristles 112 such that the user only needs to turn the toothbrush 100 by 90 degrees to use the scrubber 116 on the same surface that was being brushed with the brush head 102.

The scrubber 116 is manufactured from any material suitable for use in the mouth to clean the tongue or other oral structures. Suitable materials include, but are not limited to, silicone and rubber. The scrubber 116 is manufactured integrally with the brush head 102 such that the scrubber 116 cannot be removed from the brush head 102. For example, the scrubber 116 is molded to the brush head 102 as part of a two-shot molding process in which the brush head 102 is molded with the first shot of material, and the scrubber 116 is molded with the second shot of material, where the second shot uses a different material than the first shot. The scrubber 116 can be designed such that the scrubber 116 is an identifiable shape. For example, the scrubber 116 can include the logo of the manufacturer or a popular saying.

Figure 7:
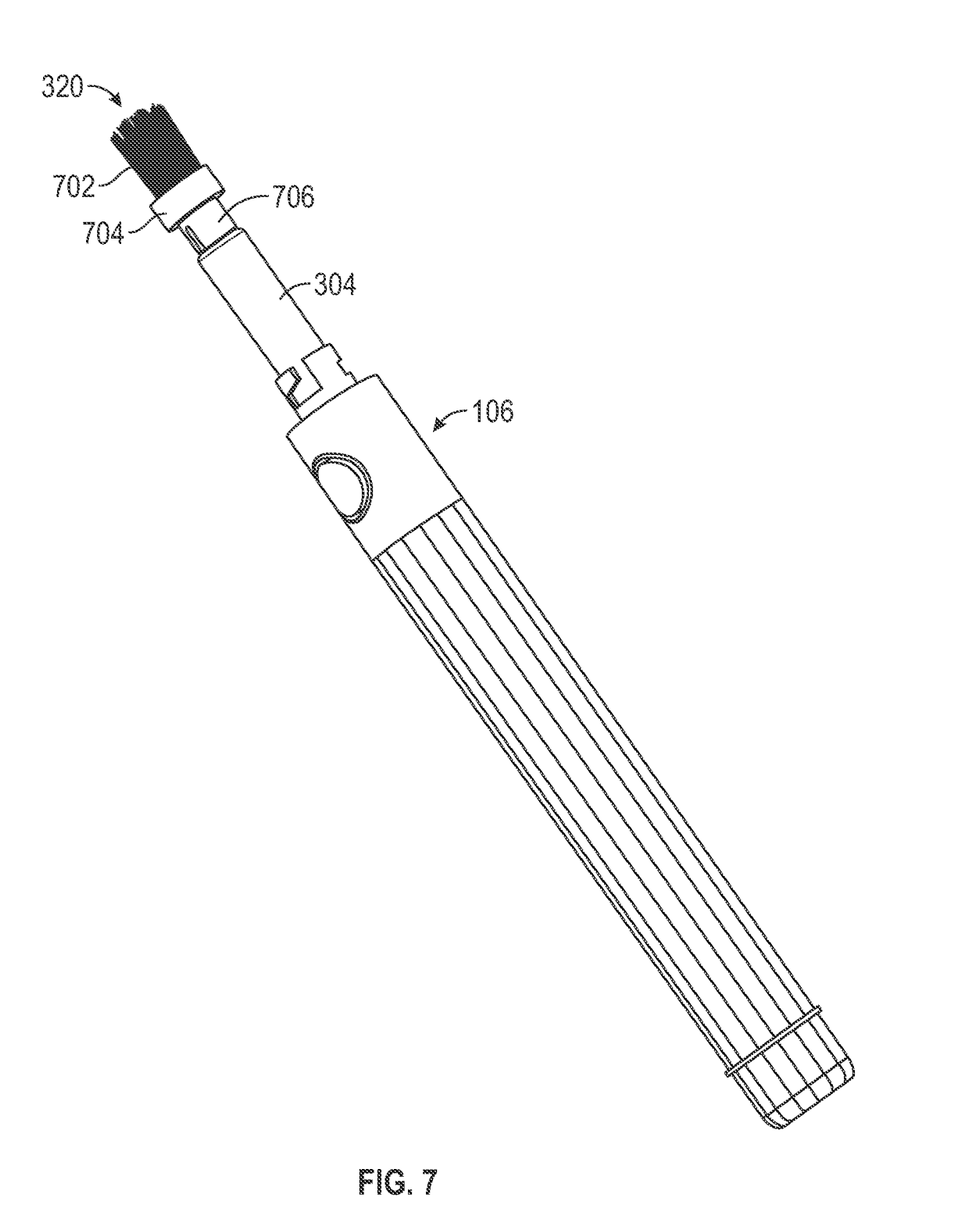
FIG. 7 is an illustration of the toothbrush of FIGS. 1-2 with an appliance brush attachment, according to some embodiments.

Referring to FIG. 7, an illustration of the toothbrush 100 of FIGS. 1-2 with an appliance brush 320 is shown, according to some embodiments. The appliance brush 320 is shown to include appliance bristles 702, a base 704, and a connector 706. The appliance bristles 702 include tufts and filaments similar to the tufts 602 and filaments 604 on the brush head 102. The appliance bristles 702 are coupled to the base 704 via a molding, stapling, or adhesive process such that the appliance bristles 702 cannot be removed from the base 704. The connector 706 extends from the base 702 and is substantially hollow to accommodate the tip 302 and the appliance brush connection 303 from FIG. 3.

To assemble the appliance brush 320 to the toothbrush 100, and with reference to FIGS. 3 and 7, the stem 104 is removed from the body 106 as described. The cap 110 is disconnected from the handle 108, the appliance brush 320 is removed, and the cap 110 is connected to the handle 108 as described. The tip 302 is inserted into the connector 706 until a tab (not shown) in the hollow portion of the connector 706 interfaces with the cap connection 314. The appliance brush 320 is rotated to engage the tab with the rib 316 to secure the appliance brush 320 to the tip 302. In this configuration, the extension 304 is visible to the user and not covered by the stem 104. In some embodiments, the user will feel a tactile sensation indicating that the appliance brush 320 is properly coupled to the extension 304. In some embodiments, the user will hear an audible indicator to indicate that the appliance brush 320 is properly coupled to the extension 304.

When the user desires to clean an orthodontic appliance (e.g., an aligner configured to reposition a tooth of the user, a night guard, a retainer, dentures, or other orthodontic appliance), the user couples the appliance brush 320 as described and turns on the toothbrush 100 by pressing the button 120. The motor rotates, causing the appliance brush 320 to vibrate to aid in cleaning the orthodontic appliance. When the orthodontic appliance is clean, the user presses the button 120 to stop the motor, thereby stopping the vibration. In some embodiments, there is a vibration mode operable to clean an orthodontic appliance (e.g., an aligner). For example, a higher or lower vibration speed than one used for cleaning teeth may be suitable for cleaning an orthodontic appliance. After connecting the appliance brush 320, the user can press the button 120 to cycle through the vibration speeds until reaching the setting suitable for an orthodontic appliance.

Figure 8:
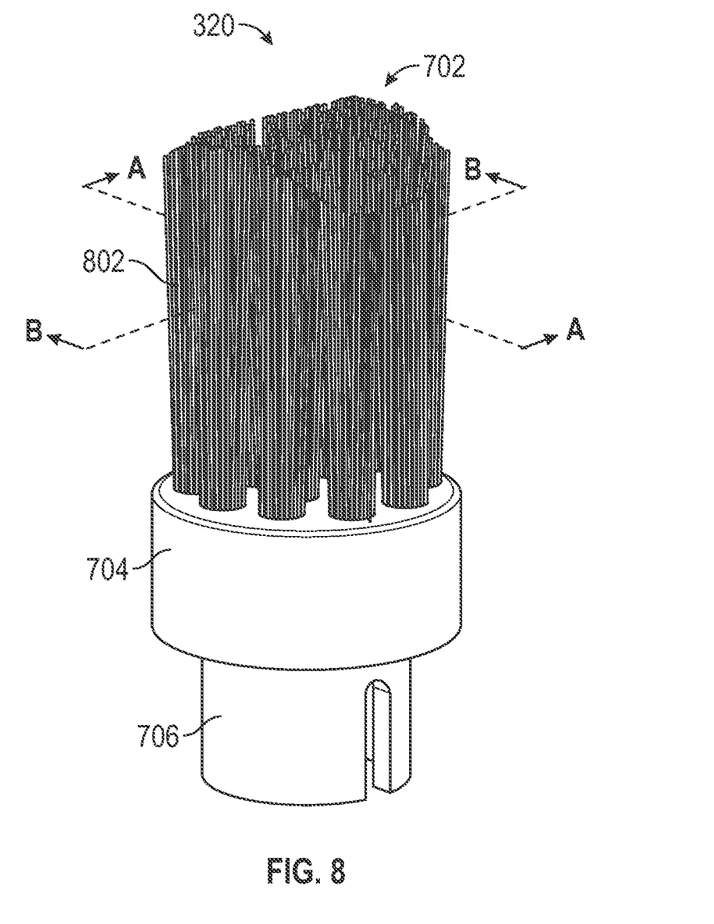
FIG. 8 is an illustration of the appliance brush of FIG. 7.

Referring to FIG. 8, an illustration of the appliance brush 320 of FIG. 7 is shown. The appliance bristles 702 are composed of tufts 802 that are arranged around the surface of the base 704. As shown, the base 704 has a circular cross section; however, the base 704 can be any cross-sectional shape that can be used in a dental or orthodontic implement. The tufts 802 can be comprised of different lengths such that the tufts 802 create a convex surface for the appliance bristles 702. In some embodiments, the shape of the appliance bristles 702 can be symmetric (e.g., the shape of the appliance bristles 702 will look the same regardless of the angle from which the user views the appliance bristles 702). In some embodiments, the shape of the appliance bristles 702 can be asymmetric (e.g., the shape of the appliance bristles 702 will look different depending on the angle from which the user views the appliance bristles 702). For example, the appliance bristles 702 may be arranged such that the cross-section of the appliance bristles 702 looks different across section A-A than it does across section B-B. The shape of the appliance bristles 702 across sections A-A and B-B will be further described with reference to FIGS. 9-10.

Figure 9:
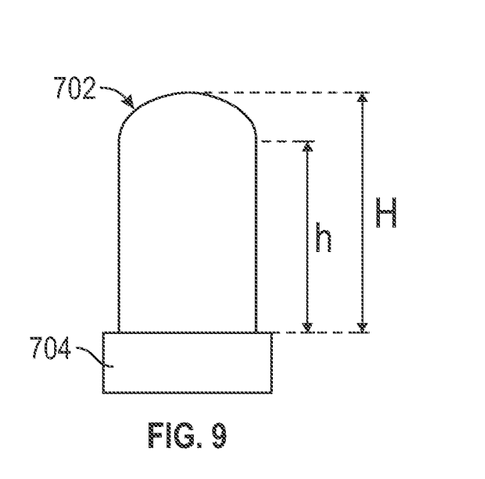
FIG. 9 is block diagram of a cross section of the appliance brush of FIG. 8 viewed from section A-A.
Figure 10:
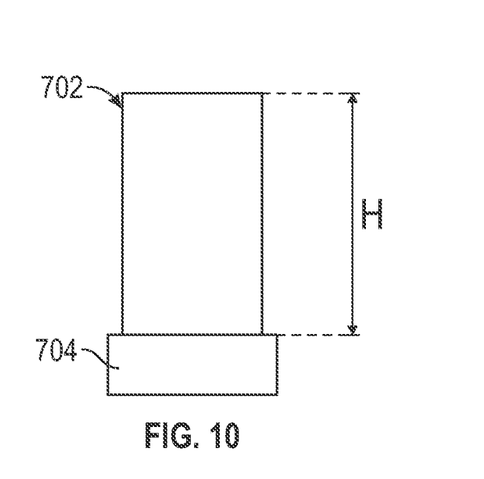
FIG. 10 is a block diagram of a cross section of the appliance brush of FIG. 8 viewed from section B-B.

Referring to FIGS. 9-10, FIG. 9 is a block diagram of a cross section of the appliance brush 320 of FIG. 8 viewed from section A-A, and FIG. 10 is a block diagram of a cross section of the appliance brush 320 of FIG. 8 viewed from section B-B. As shown in FIG. 9, when viewed from section A-A, the appliance bristles 702 extend from a height h at the periphery of the base 704 to a height H at the center of the base 704, where H is greater than h. Thus, viewed from section A-A, the appliance bristles 702 exhibit a convex shape. The convex shape is useful when cleaning an orthodontic appliance such as an aligner. An aligner includes various cavities and recesses that correspond to the teeth of the user. The convex shape of the appliance bristles 702 allows the appliance bristles 702 to reach the bottom of the cavities and recesses to clean the aligner effectively without encountering interference from the walls of the aligner.

As shown in FIG. 10, when viewed from section B-B, the appliance bristles 702 reach height H across the entire length of the base 704. Because the view from section B-B differs from the view from section A-A, the appliance bristles 702 are not symmetric. This asymmetric configuration of the appliance bristles 702 provides for the ability to reach the deepest portions of the cavities and recesses in an aligner along the entire length of the appliance bristles 702, resulting in more efficient cleaning than if symmetric bristles are used.

Figure 11:
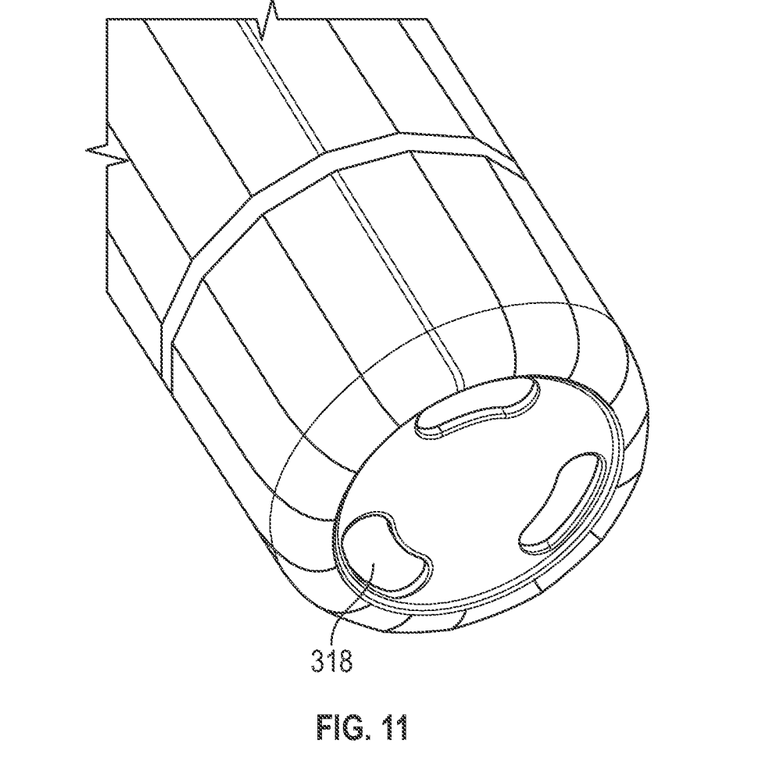
FIG. 11 is an illustration of a cap of the toothbrush of FIGS. 1-2.

Referring to FIG. 11, an illustration of a cap 110 of the toothbrush 100 of FIGS. 1-2 is shown. As described, the cap 110 includes at least one aperture 318 to provide for drainage of fluid when the appliance brush 320 is stored in the cap 110. For example, after using the appliance brush 320 to clean a night guard, the user rinses the appliance brush 320 in water and immediately inserts the appliance brush 320 into the handle 108 and attaches the cap 110 to the handle 108 to enclose the appliance brush 320 in the toothbrush 100. The bristles may not be completely dry when the appliance brush 320 is stored in the toothbrush 100, therefore water can flow from the appliance brush 320 and out of the aperture 318. In some embodiments, the apertures 318 can include a plurality of apertures 318 spaced around the cap 110. The aperture 318 can be any shape suitable for drainage (e.g., circular, rectangular, elliptical, or any other shape suitable for drainage).

Figure 12:
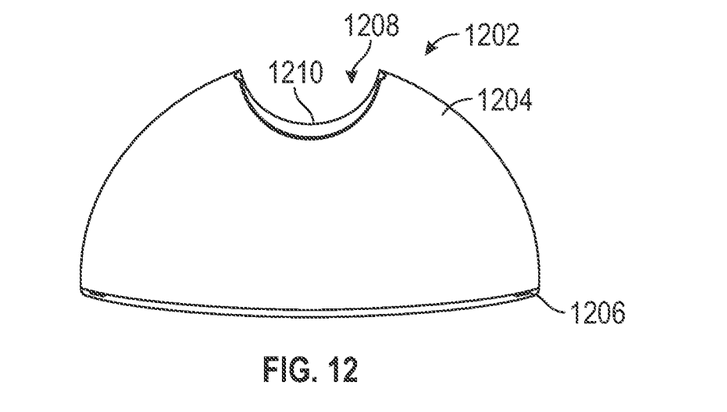
FIG. 12 is an illustration of a dock, according to some embodiments.

Referring to FIG. 12, an illustration of a dock 1202 is shown, according to some embodiments. The dock 1202 is configured to maintain the toothbrush 100 in an upright position and to protect the bristles 112 when transporting the toothbrush 100. The dock 1202 includes a cover 1204, a base 1206, a recess 1208, and a magnetic portion 1210. The cover 1204 is releasably coupled to the base 1206. The coupling mechanism can be any coupling mechanism that provides the ability to connect components securely when desired, and to easily disconnect when desired. Examples of suitable coupling mechanisms include a bayonet connection and a threaded connection. The cover 1204 and the base 1206 are manufactured from any material suitable for storing a toothbrush (e.g., plastic, metal, or any other suitable material). The base 1206 can include an attachment mechanism (not shown) opposite the cover 1204 to attach the dock 1202 to a surface. For example, the attachment mechanism can include a suction device (e.g., a suction cup), a reusable adhesive, a magnet, a friction surface, or any other attachment mechanism suitable to attach the dock 1202 to a surface (e.g., a lateral surface such as a counter top, a vertical surface such as a mirror or wall) and support the weight of the toothbrush 100.

The recess 1208 is sized and configured to receive the cap 110 and/or the handle 108 of the toothbrush 100 such that the toothbrush 100 stands upright when the cap 110 and/or the handle 108 is inserted into the recess 1208. The recess 1208 will be further described with reference to FIGS. 14-15.

The magnetic portion 1210 is sized and configured to receive the handle 108 and/or the body 106 of the toothbrush 100 such that the toothbrush 100 is magnetically secured to the dock 1202 when the handle 108 and/or the body 106 contacts the magnetic portion 1210. As shown, the magnetic portion 1210 exhibits a curvature. The curvature of the magnetic portion 1210 is designed to substantially match the curvature of the handle 108 and/or the body 106 to provide for a larger surface area for a suitable magnetic connection. Accordingly, the shape of the magnetic portion 1210 can be modified to match the shape of the handle 108 and/or the body 106 should the shape of the handle 108 and/or the body 106 be modified. The magnetic portion 1210 will be further described with reference to FIGS. 13 and 15.

Figure 13:
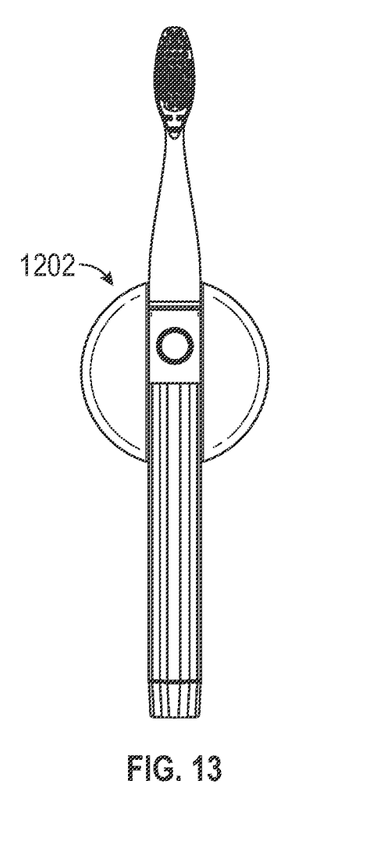
FIGS. 13-15 are illustrations of the dock of FIG. 12 coupled with the toothbrush of FIGS. 1-2, according to various embodiments.
Figure 14:
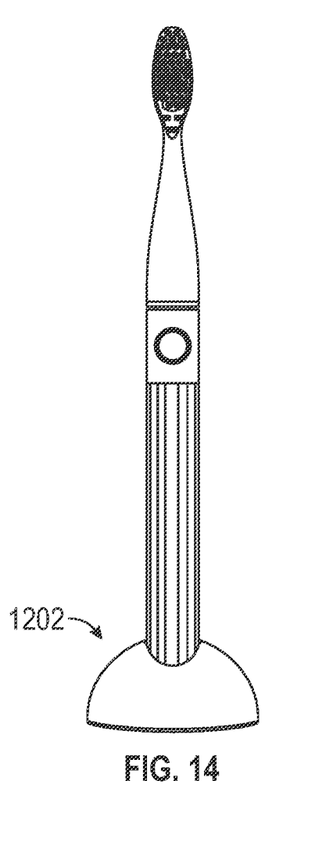
Figure 15:
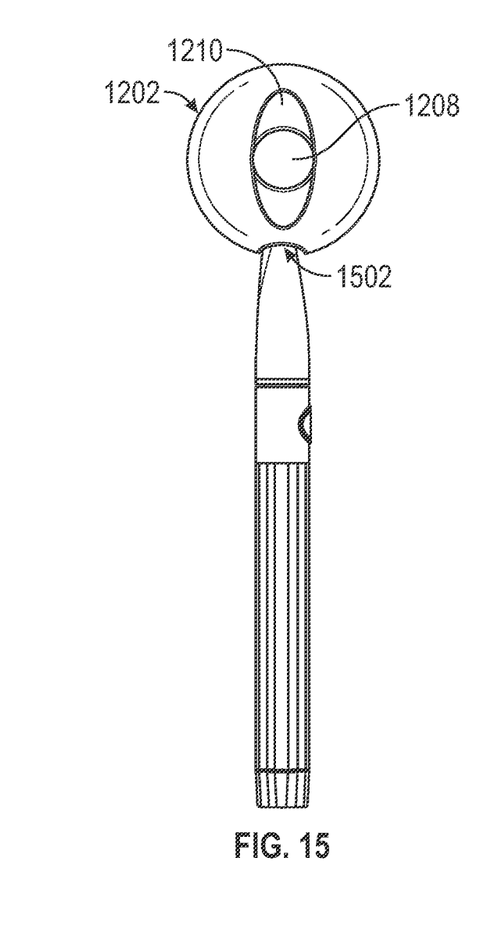

Referring to FIGS. 13-15, illustrations of the dock 1202 of FIG. 12 assembled to the toothbrush 100 of FIGS. 1-2 are shown, according to various embodiments. As shown in FIG. 15, the magnetic portion 1210 extends substantially along the cover 1204, and the recess 1208 extends deeper into the cover 1204 than the magnetic portion 1210. Furthermore, the cover 1204 and the base 1206 define an opening 1502 sized and configured to receive the stem 104 such that the brush head 102 can be covered when transporting the toothbrush 100. For example, a user desiring to cover the brush head 102 will remove the cover 1204 from the base 1206, place the brush head 102 in a designated location within the base 1206, and attach the cover 1204 to the base 1206 to cover the brush head 102. The orientation of the brush head 102 in the base 1206 will be further described with reference to FIG. 16.

To store the toothbrush 100 on a horizontal surface, as shown in FIG. 14, the user can place the dock 1202 on the horizontal surface. The user can attach the dock 1202 to the horizontal surface (e.g., by using the suction cup attachment), however attachment to the horizontal surface is not necessary. After using the toothbrush 100, the user places the toothbrush 100 in the dock 1202 such that the cap 110 extends into the recess 1208. In some embodiments, the recess 1208 is sized to receive the cap 110 and a portion of the handle 108. The recess 1208 is configured to securely hold the toothbrush 100 such that the toothbrush 100 remains upright until the user removes the toothbrush 100 from the dock 1202.

To store the toothbrush 100 on a vertical surface, as shown in FIG. 13, the user can use the attachment mechanism on the base 1206 to attach the dock 1202 to the vertical surface. For example, if the attachment mechanism on the base 1206 is a suction cup, the user pushes the suction cup against the flat surface such that the suction force maintains the dock 1202 in the vertical position. After using the toothbrush 100, the user places the toothbrush 100 in the dock 1202 such that the handle 108, the body 106, or some combination thereof, is in contact with the magnetic portion 1210. In some embodiments, the material of the handle 108 and/or the body 106 is magnetic such that the magnetic portion 1210 attracts the handle 108 and/or the body 106. In some embodiments, the handle 108 and/or the body 106 are not magnetic. In such embodiments, the magnetic portion 1210 is configured to attract the motor in the body 106 or the battery 312 in the handle 108 to provide the connection. The magnetic force between the magnetic portion 1210 and the toothbrush 100 is sufficient to maintain the toothbrush 100 in a vertical position and prevent the toothbrush 100 from falling from the dock 1202.

Figure 16:
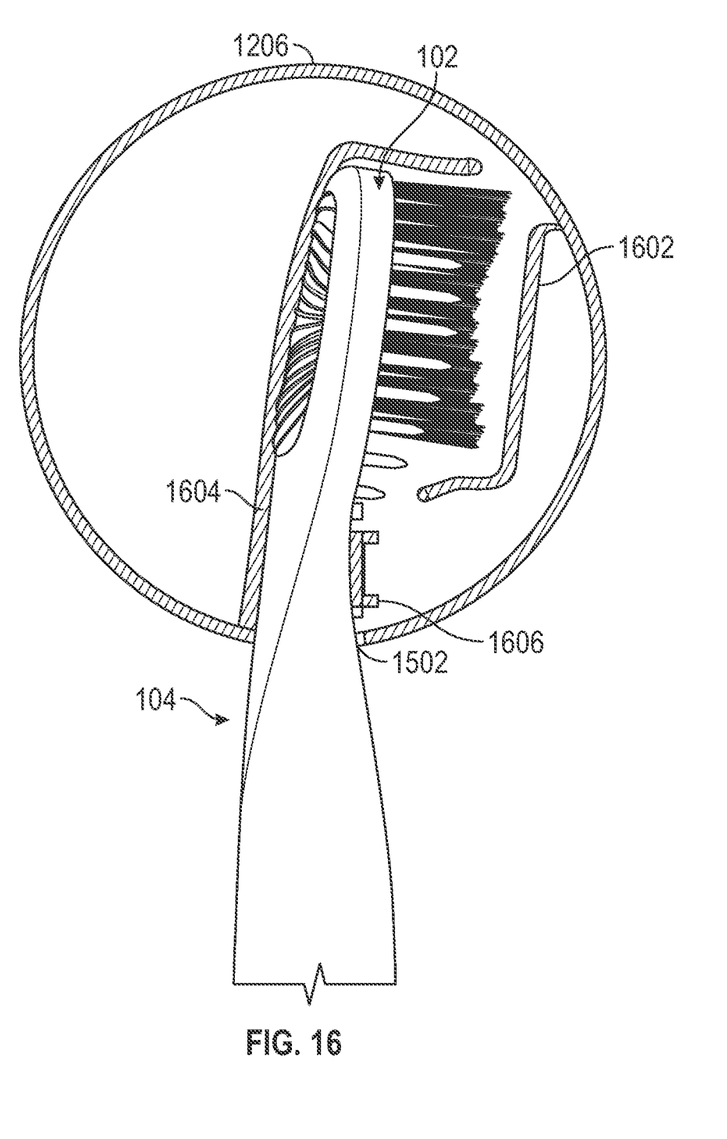
FIG. 16 is an illustration of a base of the dock of FIG. 12, according to various embodiments.

Referring to FIG. 16, an illustration of the base 1206 of the dock 1202 of FIG. 12 is shown, according to various embodiments. The base 1206 is configured to secure the brush head 102 and includes a bristle wall 1602, a brush head wall 1604, and a stem wall 1606. The brush head wall 1604 protrudes from the bottom of the base 1206 and extends from the opening 1502. The brush head wall 1604 curves such that the brush head wall 1604 substantially matches the shape of the upper portion of the stem 104 and the brush head 102. The bristle wall 1602 protrudes from the bottom of the base 1206 and is shaped to substantially match the shape of the bristles 112. The stem wall 1606 protrudes from the bottom of the base 1206 and extends from the opening 1502. The stem wall 1606 is positioned to substantially match the shape of the stem 104. In some embodiments, the stem 104 is tapered such that the stem 104 increases in width as the stem 104 extends away from the brush head 102. Accordingly, the stem wall 1606 is shaped such that the distance between the stem wall 1606 and the brush head wall 1604 is larger at the opening 1502 than it is deeper into the base 1206.

To store the toothbrush 100 in the dock 1202, the user removes the cover 1204 from the base 1206, as described. The user places the toothbrush 100 in the base 1206 such that the brush head 102 and a portion of the stem 104 fits within the boundaries provided by the bristle wall 1602, the brush head wall 1604, and the stem wall 1606. The user attaches the cover 1204 to the base 1206 to secure the toothbrush 100 in the dock 1202. In some embodiments, the cover 1204 includes surfaces similar to the bristle wall 1602, the brush head wall 1604, and the stem wall 1606 for additional securement of the toothbrush 100. In some embodiments, the cover 1204 does not include additional surfaces, and the toothbrush 100 is secured by the bristle wall 1602, the brush head wall 1604, and the stem wall 1606, in combination with the cover 1204.

Figure 17:
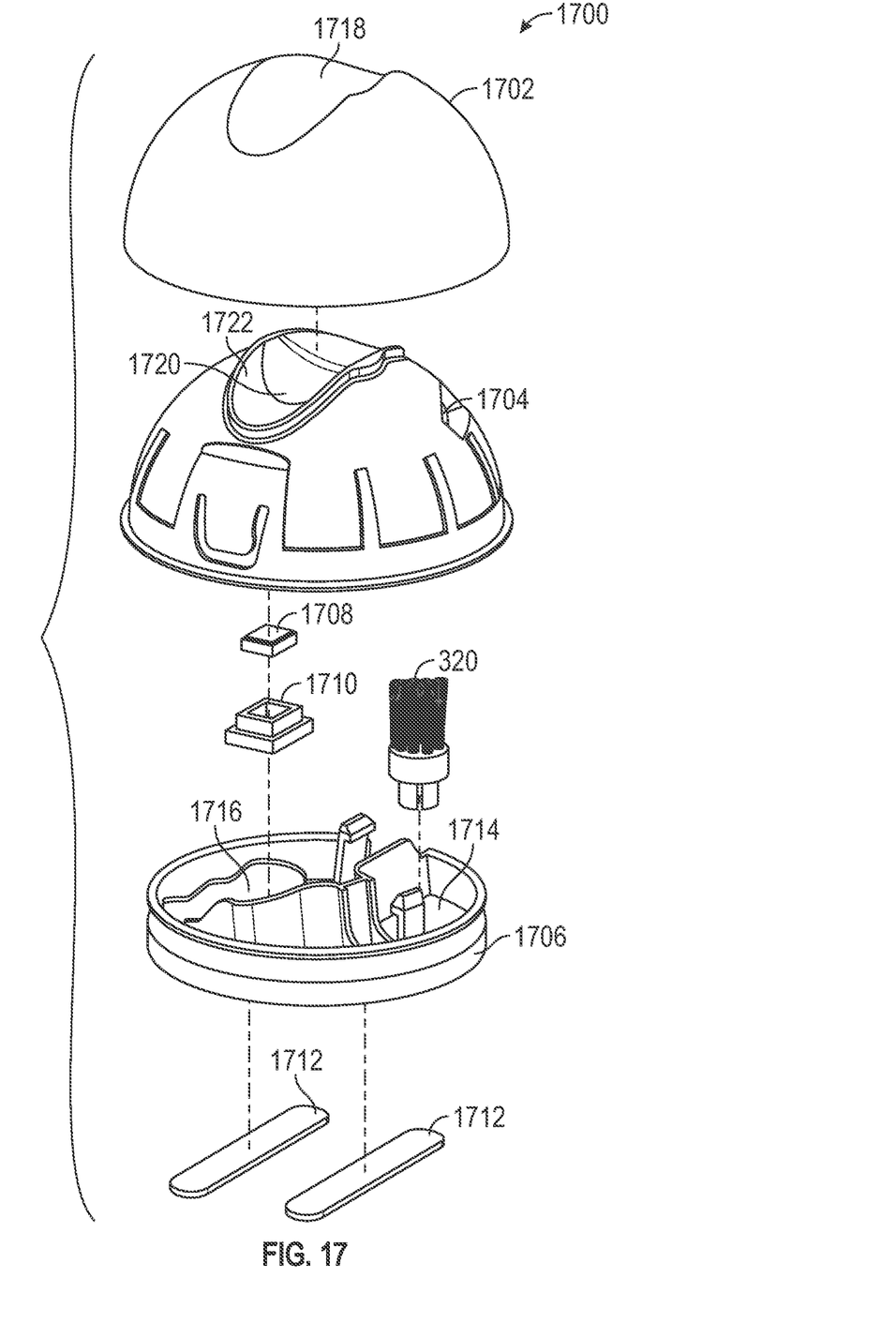
FIG. 17 is an illustration of a dock according to another embodiment.

Referring to FIG. 17, an illustration of dock 1700 is shown, according to another embodiment. The dock 1700 is configured to store or secure the toothbrush 100 and the appliance brush 320 when the toothbrush 100 is being transported to protect and more easily transport the toothbrush 100 and the appliance brush 320. The dock 1700 includes a cover shell 1702, a cover 1704, a base 1706, a magnet cover 1702, and a magnet 1708. The cover shell 1702, cover 1704, and base 1706 are manufactured from any material suitable for storing the toothbrush 100 and/or the appliance brush 320 (e.g., plastic, metal, or any other suitable material). The cover shell 1702 may be releasably coupled to the cover 1704, in some embodiments; however, the cover shell 1702 may also be coupled to the cover 1704 such that the cover 1704 cannot be removed from the cover shell 1702. In embodiments where the cover shell is releasably coupled to the cover 1704, the coupling mechanism can be any coupling mechanism that provides the ability to connect components securely when desired, and to easily disconnect when desired. Examples of suitable coupling mechanisms include a bayonet connection and a threaded connection. The cover 1704 may be releasably coupled to the base 1706. The coupling mechanism can be any coupling mechanism that provides the ability to connect components securely when desired, and to easily disconnect when desired. Examples of suitable coupling mechanisms include a bayonet connection and a threaded connection. The cover 1704 may also be rotatable with respect to the base 1706 such that the orientation of the cover 1704 can be modified as desired by a user.

The cover shell 1702 includes an opening 1718, and the cover 1704 includes a recess 1720 and a magnetic contact portion 1722. The opening 1718 is an aperture located in the cover shell 1702 such that the toothbrush 100 can be inserted into the recess 1720 to be stored in an upright position when the dock 1700 is positioned on a horizontal surface.

The base 1706 is configured to secure the magnetic cover 1702, and the magnetic cover 1702 is configured to secure the magnet 1708. The magnet 1708 can be any type of magnet of strength sufficient to secure the toothbrush 100 to the dock 1700 when the dock 1700 is in a vertical position and to prevent the toothbrush 100 from slipping from the dock 1700. Examples of the magnet 1708 include, but are not limited to, aluminum-iron-cobalt-nickel ("alnico") magnets, neodymium magnets, samarium cobalt magnets, ferrite magnets, bonded magnets, and any other type of magnet suitable for the application. In some embodiments, the magnetic cover is secured to the cover 1704 such that the magnet 1708 is closer in proximity to the magnetic portion 1722 to provide for a stronger magnetic force at the magnetic portion 1722 than if the magnet 1708 is secured in the base 1706.

The base 1706 further includes a brush head cavity 1716 and an appliance brush cavity 1714. The brush head cavity 1716 is sized and configured to secure the brush head 102 in between the base 1706 and the cover 1704 such that the brush head 100 is secured and protected. The appliance brush cavity 1714 is sized and configured to secure the appliance brush 320 in between the base 1706 and the cover 1704 such that the appliance brush 320 is secured and protected. In some embodiments, the base 1706 includes apertures through which liquid from the brush head 102 and/or the appliance brush 320 can flow (e.g., flow out of the dock 1700).

The base 1706 also includes one or more sponge 1712. The sponge 1712 is coupled to the underside of the base 1706 such that the sponge 1712 supports the base 1706 on the surface on which the base 1706 is placed. The sponge 1712 can be reusable such that the sponge 1712 can be attached to, and removed, from various surfaces to secure the dock 1700 to various surfaces. In some embodiments where the ability of the sponge 1712 to adhere to the desired surface is diminished, the adhesive properties of the sponge may be restored by washing the sponge 1712 with water.

The dock 1700 can be coupled to a horizontal surface using the sponge 1712 such that the dock 1700 remains stationary with respect to the horizontal surface. To store the toothbrush 100 in the dock 1700, the user inserts the handle 108 into the recess 1720, and the recess 1720 provides support for the toothbrush 100 such that the toothbrush 100 remains in an upright position.

The dock 1700 can be coupled to a vertical surface using the sponge 1712 such that the dock 1700 remains stationary with respect to the vertical surface. In some embodiments, the user may install the dock 1700 on the vertical surface such that the magnetic portion 1722 is not substantially vertical (e.g., within 10 degrees of vertical). In such embodiments, the user can rotate the cover 1704 with respect to the base 1706 such that the magnetic portion 1722 is substantially vertical. To store the toothbrush 100 in a vertical position, the user places the handle 108 on the magnetic portion 122 such that the magnet 1708 provides an attractive force between the magnet 1708 and the handle 108 and/or the internal components of the toothbrush 100 (e.g., the battery 312 and/or other internal components).

It is important to note that the construction and arrangement of the systems, apparatuses, and methods shown in the various exemplary embodiments is illustrative only. Additionally, any element disclosed in one embodiment may be incorporated or utilized with any other embodiment disclosed herein. For example, any of the exemplary embodiments described in this application can be incorporated with any of the other exemplary embodiment described in the application. Although only one example of an element from one embodiment that can be incorporated or utilized in another embodiment has been described above, it should be appreciated that other elements of the various embodiments may be incorporated or utilized with any of the other embodiments disclosed herein.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

What is claimed is:

1. An apparatus comprising:
a toothbrush head comprising a stem, the toothbrush head configured to brush teeth;
an appliance brush configured to brush a dental appliance; and
a body configured to be releasably coupled with either one of the toothbrush head and the appliance brush such that the appliance brush and the toothbrush head are interchangeable, the body comprising an extension, the extension configured to be at least substantially covered by the stem when the toothbrush head is coupled with the body;
wherein the appliance brush is configured to couple to a tip of the extension when the toothbrush head is not coupled with the body, and wherein the extension is substantially exposed when the appliance brush is coupled to the tip of the extension.

2. The apparatus of claim 1, wherein the appliance brush comprises appliance bristles comprising a plurality of tufts of different lengths, the plurality of tufts arranged to form a convex brushing surface.

3. The apparatus of claim 2, wherein the appliance bristles are arranged in a circular shape.

4. The apparatus of claim 2, wherein the convex brushing surface is asymmetrical.

5. The apparatus of claim 2, wherein the convex brushing surface is symmetrical.

6. The apparatus of claim 1, wherein the extension comprises a first rib, wherein the stem comprises a first tab, and wherein the first rib is configured to engage the first tab to secure the stem to the extension.

7. The apparatus of claim 6, wherein the extension comprises a second rib, wherein the appliance brush comprises a second tab, and wherein the second rib is configured to engage the second tab to secure the extension to the appliance brush.

8. The apparatus of claim 1, further comprising a dock configured to hold the body while either of the toothbrush head or the appliance brush is coupled with the body.

9. The apparatus of claim 1, further comprising a dock configured to store the appliance brush when the appliance brush is decoupled from the body.

10. A system comprising:
a toothbrush head comprising toothbrush bristles configured to brush teeth and a stem extending from the toothbrush head;
an appliance brush comprising appliance bristles configured to brush a dental appliance, wherein the dental appliance is an aligner configured to reposition a tooth of a user;
a body configured to be releasably coupled with either one of the toothbrush head and the appliance brush such that the appliance brush and the toothbrush head are interchangeable, the body releasably coupled with the stem by an extension of the body, the extension configured to be at least substantially covered by the stem when the toothbrush head is coupled with the body; and
a dock configured to be releasably coupled with the body, the dock comprising a cover and a base that form a compartment configured to store the appliance brush when the appliance brush is decoupled from the body, the cover configured to be removed from the base to enable the compartment to be accessed;
wherein the appliance brush is configured to couple to a tip of the extension when the toothbrush head is not coupled with the body, and wherein the extension is substantially exposed when the appliance brush is coupled to the tip of the extension.

11. The system of claim 10, wherein the base comprises a bristle wall and a brush head wall, and wherein a space between the brush head wall and the bristle wall is configured to receive the toothbrush head.

12. The system of claim 11, wherein the toothbrush head is secured in the space when the cover is coupled to the base.

13. The system of claim 10, wherein the base includes a recess configured to receive the body such that when the body is placed in the recess, the body is held in a vertical position.

14. The system of claim 10, wherein the base includes a securing component configured to releasably secure the dock to an at least substantially smooth surface.

15. The system of claim 10, wherein the cover having includes a magnetic portion configured to be releasably coupled with the body.

16. The system of claim 10, wherein the appliance bristles comprise a plurality of tufts of different lengths, the plurality of tufts arranged to form a convex brushing surface.

17. An apparatus comprising:
a toothbrush head comprising a stem and being configured to brush teeth;
an appliance brush configured to brush a dental appliance, wherein the dental appliance is an aligner configured to reposition a tooth of a user; and
a body configured to be releasably coupled with either one of the toothbrush head and the appliance brush such that the appliance brush and the toothbrush head are interchangeable, the body comprising an extension configured to be at least substantially covered by the stem when the toothbrush head is coupled with the body, and the appliance brush couples with a tip of the extension leaving the extension substantially exposed when the appliance brush is coupled with the body.

18. The apparatus of claim 17, wherein the appliance brush comprises first bristles arranged in a first pattern, and wherein the toothbrush head comprises second bristles arranged in a second pattern.

19. The apparatus of claim 18, wherein the first bristles are arranged in a circular shape.

20. The apparatus of claim 18, wherein the first pattern forms a convex brushing surface, and wherein the convex brushing surface is asymmetrical or symmetrical.

21. The apparatus of claim 17, further comprising a dock configured to hold the body, the dock comprising a cavity disposed between a cover and a base, the cavity configured to store the appliance brush when the appliance brush is decoupled from the body.

22. The apparatus of claim 17, wherein when the appliance brush is coupled with the body, a greater portion of the body is exposed than when the toothbrush head is coupled with the body.

* * * * *